(12) United States Patent
Mikawa et al.

(10) Patent No.: US 10,707,573 B2
(45) Date of Patent: Jul. 7, 2020

(54) ANTENNA DEVICE AND ELECTRONIC APPARATUS

(71) Applicant: Murata Manufacturing Co., Ltd., Nagaokakyo-shi, Kyoto-fu (JP)

(72) Inventors: Kentaro Mikawa, Nagaokakyo (JP); Tsuyoshi Suesada, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 143 days.

(21) Appl. No.: 16/011,710

(22) Filed: Jun. 19, 2018

(65) Prior Publication Data

US 2018/0301805 A1 Oct. 18, 2018

Related U.S. Application Data

(63) Continuation of application No. PCT/JP2017/000959, filed on Jan. 13, 2017.

(30) Foreign Application Priority Data

Feb. 10, 2016 (JP) ................. 2016-023562

(51) Int. Cl.
*H01Q 3/24* (2006.01)
*H01Q 7/00* (2006.01)
*H04B 5/00* (2006.01)
*H02J 50/12* (2016.01)

(52) U.S. Cl.
CPC ............... *H01Q 3/24* (2013.01); *H01Q 7/00* (2013.01); *H02J 50/12* (2016.02); *H04B 5/0081* (2013.01); *H04B 5/0037* (2013.01)

(58) Field of Classification Search
CPC ........ H01G 3/24; H01G 50/12; H01G 5/0081; H01G 5/0037; H01G 7/00
See application file for complete search history.

(56) References Cited

FOREIGN PATENT DOCUMENTS

| JP | 09-35942 A | 2/1997 |
|---|---|---|
| JP | 2003-060520 A | 2/2003 |
| JP | 2007-228253 A | 9/2007 |
| JP | 2012-070529 A | 4/2012 |
| JP | 2013-093429 A | 5/2013 |

OTHER PUBLICATIONS

Official Communication issued in Japanese Patent Application No. 2017-566553, dated Mar. 26, 2019.
Official Communication issued in International Patent Application No. PCT/JP2017/000959, dated Mar. 21, 2017.

*Primary Examiner* — Graham P Smith
(74) *Attorney, Agent, or Firm* — Keating & Bennett, LLP

(57) ABSTRACT

An antenna device includes a first coil antenna conductor including first and second ends, a second coil antenna conductor including third and fourth ends, and a switching circuit. The first coil antenna conductor is wound around an axis and the second coil antenna conductor is wound around an axis. The switching circuit switches a connection state of the first coil antenna conductor and the second coil antenna conductor between connection states including series connection and parallel connection.

20 Claims, 9 Drawing Sheets

ANTENNA DEVICE AND ELECTRONIC APPARATUS

CROSS REFERENCE TO RELATED APPLICATIONS

This application claims the benefit of priority to Japanese Patent Application No. 2016-023562 filed on Feb. 10, 2016 and is a Continuation Application of PCT Application No. PCT/JP2017/000959 filed on Jan. 13, 2017. The entire contents of each application are hereby incorporated herein by reference.

BACKGROUND OF THE INVENTION

1. Field of the Invention

The present invention relates to an antenna device, in particular, an antenna device including a plurality of coil antenna conductors, for example, and an electronic apparatus including the same.

2. Description of the Related Art

Existing antenna devices that is used for both of a near field communication (NFC) system and a non-contact power transmission system are known.

For example, Japanese Unexamined Patent Application Publication No. 2013-93429 discloses an antenna device having a configuration in which a first coil antenna conductor and a second coil antenna conductor are provided, the first coil antenna conductor is used as an NFC antenna, and the first coil antenna conductor and the second coil antenna conductor are connected in series to be used as a power transmission antenna. The above-described antenna device in which the first coil antenna conductor is also used as a portion of the power transmission antenna is therefore able to be reduced in size, cost, and weight in comparison with the case in which an NFC antenna and a power transmission antenna are separately included.

However, the antenna device disclosed in Japanese Unexamined Patent Application Publication No. 2013-93429 does not use the second coil antenna conductor when being used in the NFC system. Therefore, a portion in which the second coil antenna conductor is formed does not contribute as an antenna and is a useless space, resulting in the occurrence of a problem in that space usage efficiency is lowered. The above-described problem occurs not only in an antenna device to be used in a plurality of different systems but also in an antenna device to be used in one system, which includes an unused coil antenna conductor.

SUMMARY OF THE INVENTION

Preferred embodiments of the present invention provide antenna devices each having a configuration including a plurality of coil antenna conductors, and being capable of increasing usage efficiency of the coil antenna conductors to efficiently use a space and switching antenna characteristics, and electronic apparatuses including the antenna devices.

An antenna device according to a preferred embodiment of the present invention includes a first coil antenna conductor wound around an axis and including a first end and a second end; a second coil antenna conductor wound around an axis and including a third end and a fourth end; and a switching circuit to switch the first coil antenna conductor and the second coil antenna conductor between connection states including series connection and parallel connection.

With this configuration, both of the first coil antenna conductor and the second coil antenna conductor are used when the antenna device is used. Therefore, the antenna device capable of increasing usage efficiency of the coil antenna conductors and efficiently using a space is obtained.

Furthermore, with this configuration, the antenna device includes the switching circuit to switch the first coil antenna conductor and the second coil antenna conductor between the connection states including the series connection and the parallel connection. Therefore, the antenna device capable of switching antenna characteristics in accordance with a usage condition is obtained.

In an antenna device according to a preferred embodiment of the present invention, it is preferable that the switching circuit include a first switching portion to switch the first end of the first coil antenna conductor and the third end of the second coil antenna conductor into either of a connection or disconnection state and a second switching portion to switch the second end of the first coil antenna conductor and the fourth end of the second coil antenna conductor into either of a connection or disconnection state. With this configuration, the switching circuit is able to connect the first coil antenna conductor and the second coil antenna conductor in series or in parallel. Therefore, an antenna device capable of switching the antenna characteristics in accordance with the usage condition is obtained.

In an antenna device according to a preferred embodiment of the present invention, the switching circuit may further include a third switching portion to switch the second end of the first coil antenna conductor and the third end of the second coil antenna conductor into either of a connection or disconnection state.

An antenna device according to a preferred embodiment of the present invention preferably further includes a capacitor connecting the second end of the first coil antenna conductor and the third end of the second coil antenna conductor. With this configuration, the inductance of the first coil antenna conductor, the inductance of the second coil antenna conductor, and capacitance components of the capacitor define an LC resonance circuit.

In an antenna device according to a preferred embodiment of the present invention, it is preferable that the first coil antenna conductor include a first coil opening, the second coil antenna conductor include a second coil opening, and at least a portion of the first coil opening overlap with the second coil opening when seen from a direction of the axis of the first coil antenna conductor. With this configuration, a magnetic flux generated by a current flowing through one coil antenna conductor is easy to interlink with the other coil antenna conductor, thus causing the first coil antenna conductor and the second coil antenna conductor to be efficiently magnetic field coupled to each other.

In an antenna device according to a preferred embodiment of the present invention, it is preferable that the switching circuit connect the first coil antenna conductor and the second coil antenna conductor such that a circumferential direction of a current flowing through the first coil antenna conductor and a circumferential direction of a current flowing through the second coil antenna conductor are the same direction when seen from a direction of the axis of the first coil antenna conductor. With this configuration, a magnetic flux that is generated by the current flowing through the first coil antenna conductor and a magnetic flux that is generated by the current flowing through the second coil antenna conductor are directed in the same direction (have the same phase) and are added. Therefore, the antenna device further increasing an inductance value while reducing or preventing a conductor loss is obtained. Alternatively, the antenna device having a predetermined inductance value with a low conductor loss is also able to be obtained.

An electronic apparatus according to a preferred embodiment of the present invention includes an antenna device; and a power feeding circuit connected to the antenna device, wherein the antenna device includes a first coil antenna conductor wound around an axis and including a first end and a second end; a second coil antenna conductor wound around an axis and including a third end and a fourth end; and a switching circuit to switch the first coil antenna conductor and the second coil antenna conductor between connection states including series connection and parallel connection, and the switching circuit is connected to the power feeding circuit.

With this configuration, the electronic apparatus including the antenna device capable of increasing usage efficiency of the coil antenna conductors to efficiently use a space and switching antenna characteristics is obtained.

In an electronic apparatus according to a preferred embodiment of the present invention, it is preferable that the switching circuit include a first switching portion to switch the first end of the first coil antenna conductor and the third end of the second coil antenna conductor into either of a connection or disconnection state and a second switching portion to switch the second end of the first coil antenna conductor and the fourth end of the second coil antenna conductor into either of a connection or disconnection state, and the first switching portion and the second switching portion are connected to the power feeding circuit. With this configuration, the first coil antenna conductor and the second coil antenna conductor are able to be connected in series or in parallel. Therefore, an electronic apparatus including the antenna device capable of switching the antenna characteristics in accordance with the usage condition is obtained.

In an electronic apparatus according to a preferred embodiment of the present invention, it is preferable that the power feeding circuit include a first system power feeding circuit for a first system and a second system power feeding circuit for a second system and the first switching portion and the second switching portion are connected to either of the first system power feeding circuit or the second system power feeding circuit. With this configuration, the electronic apparatus including the antenna device that is used in a plurality of different systems is obtained.

In an electronic apparatus according to a preferred embodiment of the present invention, it is preferable that a controller configured or programmed to switch the switching circuit into a first connection state or a second connection state is further included, the switching circuit further include a fourth switching portion to switch the first switching portion and the second switching portion to connect either of the first system power feeding circuit or the second system power feeding circuit, in the first connection state, the fourth switching portion connects the first switching portion and the second switching portion to the first system power feeding circuit, the first switching portion connects the first end of the first coil antenna conductor and the third end of the second coil antenna conductor to each other and connects the first end and the third end to the first system power feeding circuit, and the second switching portion connects the second end of the first coil antenna conductor and the fourth end of the second coil antenna conductor to each other and connects the second end and the fourth end to the first system power feeding circuit, and in the second connection state, the fourth switching portion connects the first switching portion and the second switching portion to the second system power feeding circuit, the first switching portion disconnects the first end of the first coil antenna conductor and the third end of the second coil antenna conductor from each other and connects the first end to the second system power feeding circuit, the second switching portion disconnects the second end of the first coil antenna conductor and the fourth end of the second coil antenna conductor from each other and connects the fourth end to the second system power feeding circuit, and the first switching portion and the second switching portion connect the second end and the third end to each other.

With this configuration, an electronic apparatus including the antenna device that is used in a plurality of different systems and is able to switch the antenna characteristics in accordance with the system which is used is obtained.

In an electronic apparatus according to a preferred embodiment of the present invention, the first system power feeding circuit may preferably be a communication system.

In an electronic apparatus according to a preferred embodiment of the present invention, the communication system may be an NFC system.

In an electronic apparatus according to a preferred embodiment of the present invention, the second system power feeding circuit may preferably be a power transmission system.

In an electronic apparatus according to a preferred embodiment of the present invention, the power transmission system may preferably be a magnetic field resonance power transmission system.

Preferred embodiments of the present invention provide antenna devices each including a plurality of coil antenna conductors, and being capable of increasing usage efficiency of the coil antenna conductors to efficiently use a space and switching antenna characteristics, and electronic apparatuses including the antenna devices.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1A:
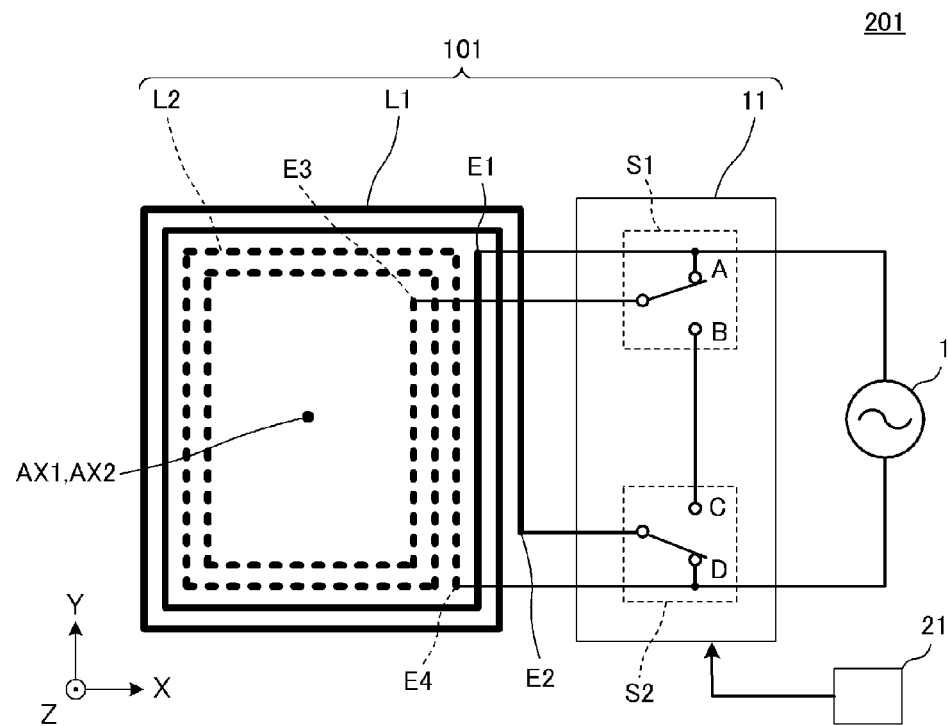
FIG. 1A is a plan view of an antenna device 101 included in an electronic apparatus 201 according to a first preferred embodiment of the present invention and FIG. 1B is a plan view illustrating a connection state of the antenna device 101, which is different from that in FIG. 1A.

Hereinafter, preferred embodiments of the present invention will be described with reference to the drawings. In the respective drawings, the same reference numerals denote the same elements. Although preferred embodiments of the present invention are described in a divided manner for the convenience of description of the primary points or ease of understanding, partial replacement or combination of components described in different preferred embodiments may be made. In second and subsequent preferred embodiments, description of common portions and elements to those in the first preferred embodiment is omitted and only different points are described. In particular, similar advantageous effects with similar configurations are not separately described in each preferred embodiment.

First Preferred Embodiment

Figure 1B:
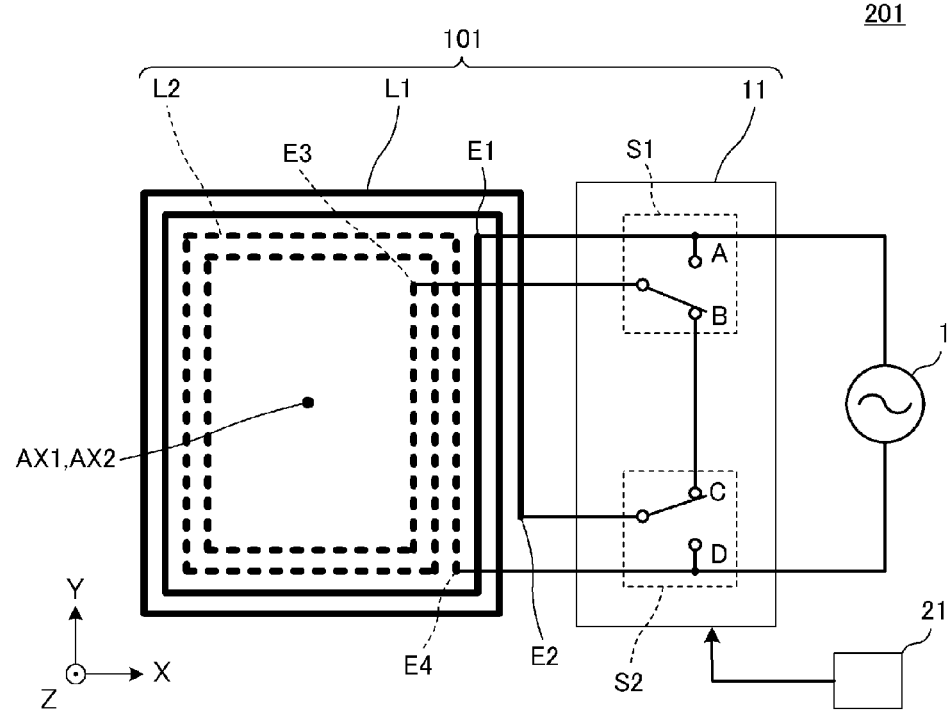

FIG. 1A is a plan view of an antenna device 101 included in an electronic apparatus 201 according to a first preferred embodiment of the present invention and FIG. 1B is a plan view illustrating a connection state of the antenna device 101, which is different from that in FIG. 1A.

Figure 2A:
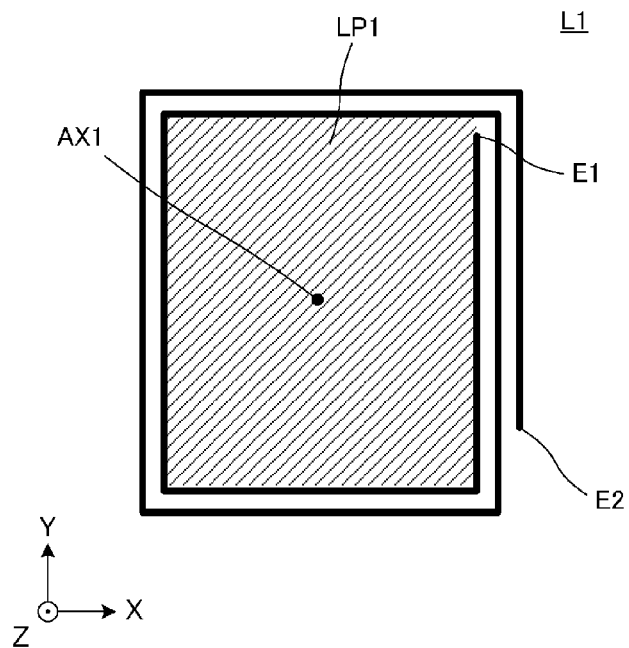
FIG. 2A is a plan view illustrating a first coil antenna conductor L1 included in the antenna device 101 and a first coil opening LP1 of the first coil antenna conductor L1 and FIG. 2B is a plan view illustrating a second coil antenna conductor L2 included in the antenna device 101 and a second coil opening LP2 of the second coil antenna conductor L2.
Figure 2B:
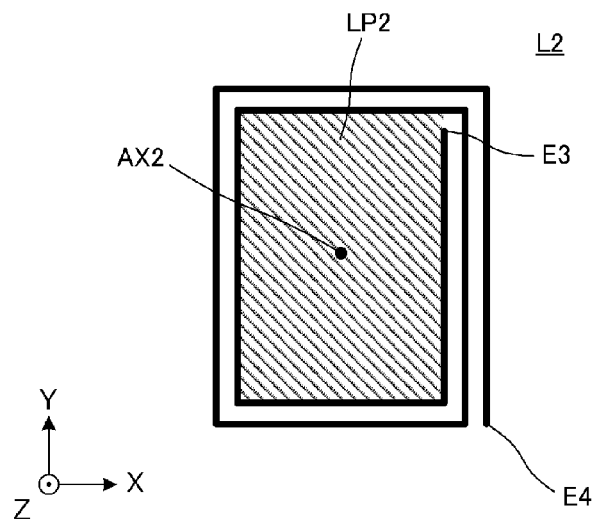

FIG. 2A is a plan view illustrating a first coil antenna conductor L1 included in the antenna device 101 and a first coil opening LP1 of the first coil antenna conductor L1 and FIG. 2B is a plan view illustrating a second coil antenna conductor L2 included in the antenna device 101 and a second coil opening LP2 of the second coil antenna conductor L2. In FIGS. 1A and 1B, the second coil antenna conductor L2 is indicated with a dashed line in order to make the configuration of the second coil antenna conductor L2 easy to be understood.

An "antenna device" according to a preferred embodiment of the present invention is an antenna device that includes a plurality of coil antenna conductors and is used in one or a plurality of systems. An "electronic apparatus" according to a preferred embodiment of the present invention is an apparatus including the antenna device, a power feeding circuit, and other components, and is preferably, for example, a cellular phone terminal, a smartphone, a tablet terminal, a notebook personal computer (PC), a personal digital assistants (PDA), a wearable terminal, such as a smartwatch or smartglasses, a camera, a game machine, a toy, or other suitable electronic apparatus.

The electronic apparatus 201 according to the present preferred embodiment includes the antenna device 101, a controller 21, and a power feeding circuit 1 that is connected to the antenna device 101. The antenna device 101 includes the first coil antenna conductor L1, the second coil antenna conductor L2, and a switching circuit 11.

The first coil antenna conductor L1 preferably has, for example, a rectangular or substantially rectangular spiral conductor pattern with approximately more than two turns, which is wound around an axis AX1, and includes a first end E1 and a second end E2. In the present preferred embodiment, the first coil antenna conductor L1 is wound clockwise to an outer side portion from an inner side portion when seen from the Z-axis direction (direction of the axis AX1 of the first coil antenna conductor L1), and includes the first coil opening LP1.

The second coil antenna conductor L2 preferably has, for example, a rectangular or substantially rectangular spiral conductor pattern with more than two turns, which is wound around an axis AX2, and includes a third end E3 and a fourth end E4. In the present preferred embodiment, the second coil antenna conductor L2 is wound clockwise to an outer side portion from an inner side portion when seen from the Z-axis direction, and has the second coil opening LP2.

In the present preferred embodiment, the first coil antenna conductor L1 and the second coil antenna conductor L2 are provided on the same plane (XY plane). The outer diameter of the second coil antenna conductor L2 according to the present preferred embodiment is smaller than the inner diameter of the first coil antenna conductor L1, and the second coil antenna conductor L2 is disposed in the first coil opening LP1. Therefore, at least a portion of the first coil opening LP1 overlaps with the second coil opening LP2 when seen from the Z-axis direction. In the present preferred embodiment, the axis AX1 of the first coil antenna conductor L1 and the axis AX2 of the second coil antenna conductor L2 are identical or substantially identical to each other.

The switching circuit 11 includes a first switching portion S1 and a second switching portion S2 and switches the first coil antenna conductor L1 and the second coil antenna conductor L2 between connection states including series connection and parallel connection, as described in details below. The first switching portion S1 and the second switching portion S2 are preferably, for example, SPDT switches.

The first switching portion S1 is connected to each of the first end E1 of the first coil antenna conductor L1 and the third end E3 of the second coil antenna conductor L2, and switches the first end E1 and the third end E3 into either of a connection or disconnection state. The second switching portion S2 is connected to each of the second end E2 of the first coil antenna conductor L1 and the fourth end E4 of the second coil antenna conductor L2, and switches the second end E2 and the fourth end E4 into either of a connection or disconnection state. The first switching portion S1 and the second switching portion S2 are connected to the power feeding circuit 1. The power feeding circuit 1 is preferably used for an NFC system, such as a balanced input/output high frequency (HF)-band integrated circuit (IC), for example.

In the example of the connection state illustrated in FIG. 1A, the first switching portion S1 is in a connection state at a connection point A and the second switching portion S2 is in a connection state at a connection point D. Therefore, the first end E1 and the third end E3 are connected to each other and the first end E1 and the third end E3 are connected to the power feeding circuit 1. Furthermore, the second end E2 and the fourth end E4 are connected to each other and the second end E2 and the fourth end E4 are connected to the power feeding circuit 1. Accordingly, the switching circuit 11 connects the first coil antenna conductor L1 and the second coil antenna conductor L2 to the power feeding circuit 1 in parallel. In this case, the combined inductance (L1·L2/(L1+L2)) of the first coil antenna conductor L1 and the second coil antenna conductor L2 is smaller than the inductance (L1) of the first coil antenna conductor L1 and the inductance (L2) of the second coil antenna conductor L2. The combined resistance (R1·R2/(R1+R2)) of the first coil antenna conductor L1 and the second coil antenna conductor L2 is smaller than the conductor resistance (R1) of the first coil antenna conductor L1 and the conductor resistance (R2) of the second coil antenna conductor L2. Accordingly, the connection state enables the antenna device to have a high Q value with low loss.

A connection state in which the first switching portion S1 connects the first end E1 and the third end E3 to each other and connects the first end E1 and the third end E3 to the power feeding circuit 1 and the second switching portion S2 connects the second end E2 and the fourth end E4 to each other and connects the second end E2 and the fourth end E4 to the power feeding circuit 1 (a state in which the first coil antenna conductor L1 and the second coil antenna conductor L2 are connected in parallel) is an example of a "first connection state".

In the example of the connection state illustrated in FIG. 1B, the first switching portion S1 is in a connection state at a connection point B and the second switching portion S2 is in a connection state at a connection point C. Therefore, the first end E1 and the third end E3 are disconnected from each other and the first end E1 is connected to the power feeding circuit 1. Furthermore, the second end E2 and the fourth end E4 are disconnected from each other and the fourth end E4 is connected to the power feeding circuit 1. The second end E2 and the third end E3 are connected to each other. Accordingly, the switching circuit 11 connects the first coil antenna conductor L1 and the second coil antenna conductor L2 to the power feeding circuit 1 in series. In this case, the combined inductance (L1+L2) of the first coil antenna conductor L1 and the second coil antenna conductor L2 is larger than the inductance (L1) of the first coil antenna conductor L1 and the inductance (L2) of the second coil antenna conductor L2. However, the combined resistance (R1+R2) of the first coil antenna conductor L1 and the second coil antenna conductor L2 is larger than the conductor resistance (R1) of the first coil antenna conductor L1 and the conductor resistance (R2) of the second coil antenna conductor L2. Accordingly, this connection state enables the antenna device to have a high inductance value with preferable effects of magnetic flux radiation and magnetism collection.

A connection state in which the first switching portion S1 disconnects the first end E1 and the third end E3 from each other and connects the first end E1 and the fourth end E4 to the power feeding circuit 1, the second switching portion S2 disconnects the second end E2 and the fourth end E4 from each other, and the first switching portion S1 and the second switching portion S2 connect the second end E2 and the third end E3 to each other (a state in which the first coil antenna conductor L1 and the second coil antenna conductor L2 are connected in series) is an example of a "second connection state".

The controller 21 in the present preferred embodiment controls the switching circuit 11 to be in either of the "first connection state" or the "second connection state". The controller selects a connection state of the first coil antenna conductor L1 and the second coil antenna conductor L2 from the connection states including the series connection and the parallel connection. The controller 21 may be incorporated in the switching circuit 11.

The antenna device 101 in the present preferred embodiment provides the following advantageous effects.

The antenna device 101 according to the present preferred embodiment has a configuration in which both of the first coil antenna conductor L1 and the second coil antenna conductor L2 are used when the antenna device is used. Therefore, the antenna device is capable of increasing usage efficiency of the coil antenna conductors and efficiently using a space.

The antenna device 101 includes the switching circuit 11 switching the first coil antenna conductor L1 and the second coil antenna conductor L2 between the connection states including the series connection and the parallel connection (the "first connection state" and "second connection state" in the present preferred embodiment). With this configuration, the antenna device is capable of switching the antenna characteristics in accordance with a usage condition.

Figure 3A:
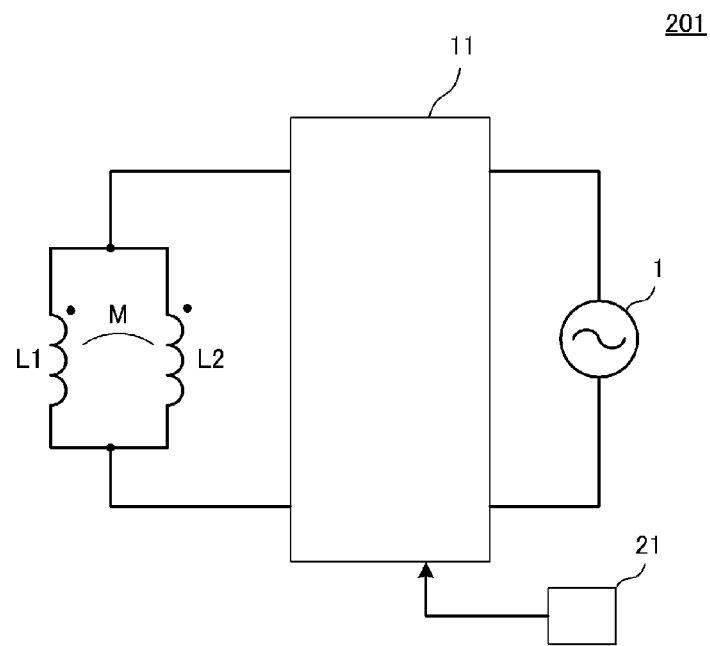
FIG. 3A is a view schematically illustrating the electronic apparatus 201 in a first connection state and FIG. 3B is a view schematically illustrating the electronic apparatus 201 in a second connection state.

Next, an antenna device in which the first coil antenna conductor L1 and the second coil antenna conductor L2 are magnetic field coupled to each other will be described with reference to the drawings. FIG. 3A is a view schematically illustrating the electronic apparatus 201 in the first connection state and FIG. 3B is a view schematically illustrating the electronic apparatus 201 in the second connection state.

Figure 3B:
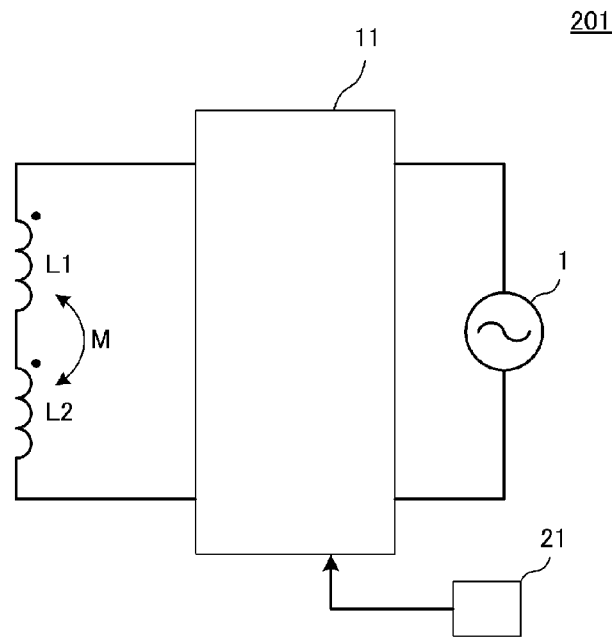

As illustrated in FIGS. 3A and 3B, in the "first connection state" and the "second connection state", the first coil antenna conductor L1 and the second coil antenna conductor L2 are magnetic field coupled to each other. With this configuration, the antenna device having a desired inductance value is obtained with not only the connection state of the first coil antenna conductor L1 and the second coil antenna conductor L2 but also a coupling degree between the first coil antenna conductor L1 and the second coil antenna conductor L2. Determination of the coupling degree between the first coil antenna conductor L1 and the second coil antenna conductor L2 enables antenna devices having various inductance values and conductor losses to be obtained, thus increasing the degree of freedom in design of the antenna device.

In the present preferred embodiment, at least a portion of the first coil opening LP1 overlaps with the second coil opening LP2 when seen from the Z-axis direction, and the axis AX1 of the first coil antenna conductor L1 and the axis AX2 of the second coil antenna conductor L2 are identical or substantially identical to each other. With this configuration, a magnetic flux generated by a current flowing through one coil antenna conductor is easy to interlink with the other coil antenna conductor, thus causing the first coil antenna conductor L1 and the second coil antenna conductor L2 to be efficiently magnetic field coupled to each other.

In addition to the above-described configuration, in the present preferred embodiment, as illustrated in FIGS. 1A and 1B, the circumferential direction of a current flowing through the first coil antenna conductor L1 and the circumferential direction of a current flowing through the second coil antenna conductor L2 are the same direction (for example, the clockwise direction or counterclockwise direction when seen from the Z-axis direction) in both of the "first connection state" and the "second connection state". Therefore, a magnetic flux that is generated by the current flowing through the first coil antenna conductor L1 and a magnetic flux that is generated by the current flowing through the second coil antenna conductor L2 are directed in the same direction (have the same phase) and are added (a mutual inductance M between the first coil antenna conductor L1 and the second coil antenna conductor L2 is positive). With this configuration, the antenna device is capable of further increasing the inductance value while reducing or preventing the conductor loss. Alternatively, the antenna device having a predetermined inductance value with a low conductor loss is able to be obtained.

Although the first coil antenna conductor L1 and the second coil antenna conductor L2 are provided on the same plane (XY plane), as an example, in the present preferred embodiment, the present invention is not limited to this configuration. The first coil antenna conductor L1 and the second coil antenna conductor L2 may be provided on different planes. When the antenna device is provided in a multilayer body including a plurality of base layers that are laminated, for example, the first coil antenna conductor L1 and the second coil antenna conductor L2 may be provided on different base layers. For example, the first coil antenna conductor L1 and the second coil antenna conductor L2 may be provided on different main surfaces of a sheet preferably made of an insulating material, such as resin, for example.

Although the entire second coil antenna conductor L2 is provided in the first coil opening LP1, that is, the entire second coil opening LP2 overlaps with the first coil opening LP1 when seen from the Z-axis direction, as an example, in the present preferred embodiment, the present invention is not limited to this configuration. The first coil antenna conductor L1 may be disposed in the second coil opening LP2 when seen from the Z-axis direction. When at least a portion of the first coil opening LP1 overlaps with the second coil opening LP2 when seen from the Z-axis direction, the first coil antenna conductor L1 and the second coil antenna conductor L2 are able to be efficiently magnetic field coupled to each other. That is to say, the axis AX1 of the first coil antenna conductor L1 and the axis AX2 of the second coil antenna conductor L2 need not to be identical or substantially identical to each other. However, it is preferable that the axis AX1 of the first coil antenna conductor L1 and the axis AX2 of the second coil antenna conductor L2 are identical or substantially identical to each other in order to obtain the above-described advantageous effects.

Figure 4A:
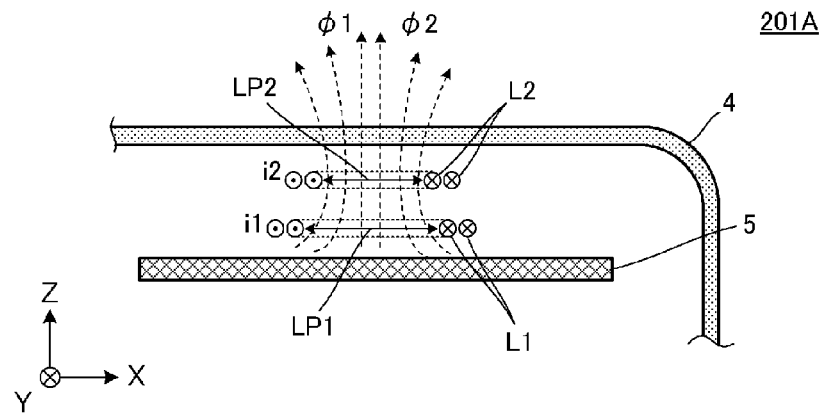
FIG. 4A is a partial cross-sectional view of an electronic apparatus 201A according to the first preferred embodiment of the present invention.
Figure 4B:
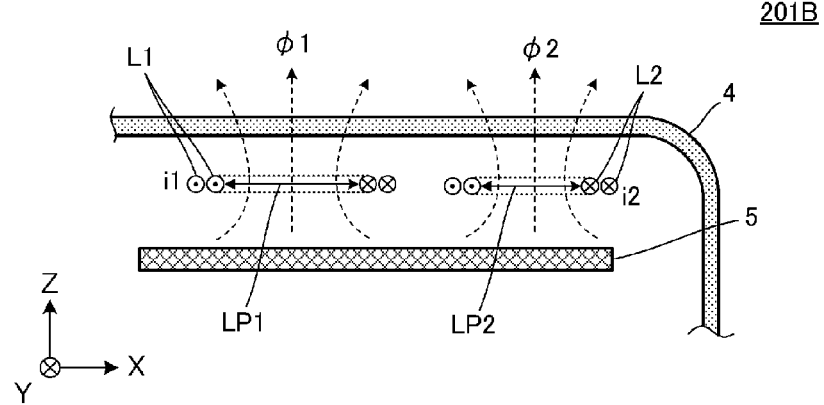
FIG. 4B is a partial cross-sectional view of an electronic apparatus 201B according to the first preferred embodiment of the present invention.
Figure 4C:
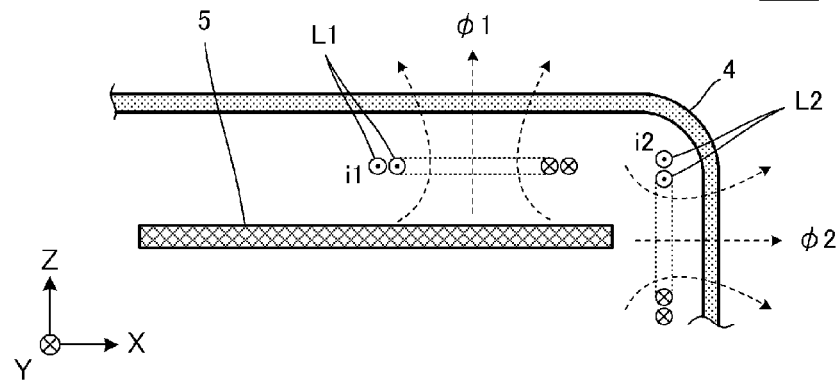
FIG. 4C is a partial cross-sectional view of an electronic apparatus 201C according to the first preferred embodiment of the present invention.

Next, advantageous effects obtained by the configuration of the two coil antenna conductors will be described with reference to the drawings. FIG. 4A is a partial cross-sectional view of an electronic apparatus 201A according to the first preferred embodiment, FIG. 4B is a partial cross-sectional view of an electronic apparatus 201B according to the first preferred embodiment, and FIG. 4C is a partial cross-sectional view of an electronic apparatus 201C according to the first preferred embodiment. FIGS. 4A to 4C omit illustration of the switching circuit, the controller, and the power feeding circuit.

The electronic apparatus 201A includes an antenna device including the first coil antenna conductor L1 and the second coil antenna conductor L2, a housing 4, a component 5 that is accommodated in the housing 4, and other components. The housing 4 is preferably made of, for example, resin and the component 5 is preferably, for example, a printed wiring substrate, a shield case, a shield plate, a battery pack, or other suitable component.

As illustrated in FIG. 4A, in the electronic apparatus 201A, the first coil antenna conductor L1 and the second coil antenna conductor L2 are disposed between the housing 4 and the component 5. Although the first coil antenna conductor L1 and the second coil antenna conductor L2 are not provided on the same plane (XY plane), the entire second coil opening LP2 overlaps with the first coil opening LP1 when seen from the Z-axis direction. Furthermore, the circumferential direction of a current i1 flowing through the first coil antenna conductor L1 and the circumferential direction of a current i2 flowing through the second coil antenna conductor L2 are the same direction when seen from the Z-axis direction.

With this configuration, in a similar manner to the above-described electronic apparatus 201, a magnetic flux $\varphi 1$ that is generated by the current i1 flowing through the first coil antenna conductor L1 and a magnetic flux $\varphi 2$ that is generated by the current i2 flowing through the second coil antenna conductor L2 are directed in the same direction (have the same phase) and are added. Accordingly, the antenna device is capable of further increasing an inductance value while reducing or preventing a conductor loss. Alternatively, the antenna device having a predetermined inductance value with a low conductor loss is able to be obtained.

The electronic apparatus 201B includes an antenna device including the first coil antenna conductor L1 and the second coil antenna conductor L2, the housing 4, the component 5 that is accommodated in the housing 4, and other components. The electronic apparatus 201B has the same or substantially the same configurations as those of the above-described electronic apparatus 201A other than the arrangement of the first coil antenna conductor L1 and the second coil antenna conductor L2.

Although the first coil antenna conductor L1 and the second coil antenna conductor L2 are provided on the same plane (XY plane), the entire second coil opening LP2 does not overlap with the first coil opening LP1 when seen from the Z-axis direction, as illustrated in FIG. 4B. The circumferential direction of the current i1 flowing through the first coil antenna conductor L1 and the circumferential direction of the current i2 flowing through the second coil antenna conductor L2 are the same direction when seen from the Z-axis direction. With this configuration, both of the magnetic flux $\varphi 1$ that is generated by the current i1 flowing through the first coil antenna conductor L1 and the magnetic flux $\varphi 2$ that is generated by the current i2 flowing through the second coil antenna conductor L2 are radiated in the same direction (have the same phase) to an outer side portion from an inner side portion of the housing 4.

With this configuration, a null point is difficult to be generated over a wide range (in particular, on the XY plane), thus obtaining the electronic apparatus that is capable of coupling to a mating coil antenna in a wide range.

The electronic apparatus 201C includes an antenna device including the first coil antenna conductor L1 and the second coil antenna conductor L2, the housing 4, the component 5 that is accommodated in the housing 4, and other components. The electronic apparatus 201C has the same or substantially the same configurations as those of the above-described electronic apparatuses 201A and 201B other than the arrangement of the first coil antenna conductor L1 and the second coil antenna conductor L2.

As illustrated in FIG. 4C, the first coil antenna conductor L1 and the second coil antenna conductor L2 are provided on different planes. To be specific, the first coil antenna conductor L1 is provided on the XY plane and the second coil antenna conductor L2 is provided on an XZ plane. As illustrated in FIG. 4C, in the electronic apparatus 201C, both of the first coil antenna conductor L1 and the second coil antenna conductor L2 are disposed between the housing 4 and the component 5. The first coil antenna conductor L1 and the second coil antenna conductor L2 are connected such that both of the magnetic flux $\varphi 1$ that is generated by the current i1 flowing through the first coil antenna conductor L1 and the magnetic flux $\varphi 2$ that is generated by the current i2 flowing through the second coil antenna conductor L2 are radiated in the same direction. For example, in FIG. 4C, both of the magnetic flux that is generated by the current i1 flowing through the first coil antenna conductor L1 and the magnetic flux $\varphi 2$ that is generated by the current i2 flowing through the second coil antenna conductor L2 are radiated in the same direction (have the same phase) to an outer side portion from an inner side portion of the housing 4.

With this configuration, a null point is difficult to be generated over a wide range (in particular, over a wide angle range), thus obtaining the electronic apparatus that is capable of coupling to a mating coil antenna in a wide range.

Although the advantageous effects when the antenna device including the first coil antenna conductor L1 and the second coil antenna conductor L2 is a transmission-side antenna have been described with reference to FIGS. 4A to 4C, even if transmission and reception sides are reversed, the advantageous effects are provided with the reversible theorem (reciprocity theorem) of an antenna. That is to say, the above-described advantageous effects are exerted in a similar manner when the antenna device including the first coil antenna conductor L1 and the second coil antenna conductor L2 is a reception-side antenna.

Second Preferred Embodiment

The configuration of a switching circuit according to a second preferred embodiment of the present invention is different from that of the switching circuit 11 according to the first preferred embodiment. Other configurations are the same or substantially the same as those of the antenna device 101.

Figure 5:
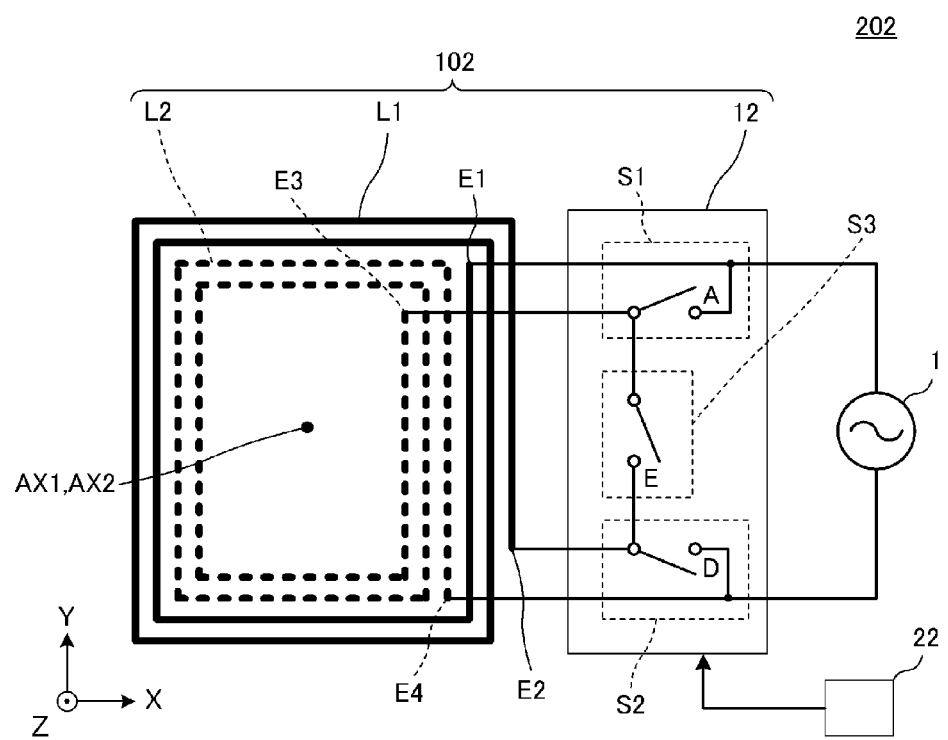
FIG. 5 is a plan view of an antenna device 102 included in an electronic apparatus 202 according to a second preferred embodiment of the present invention.

FIG. 5 is a plan view of an antenna device 102 included in an electronic apparatus 202 according to the second preferred embodiment. In FIG. 5, the second coil antenna conductor L2 is indicated with a dashed line in order to make the configuration of the second coil antenna conductor L2 easy to be understood. The same holds true in FIGS. 6A and 6B, which will be described below.

The electronic apparatus 202 according to the present preferred embodiment includes the antenna device 102, a controller 22, and the power feeding circuit 1 that is connected to the antenna device 102. The antenna device 102 includes the first coil antenna conductor L1, the second coil antenna conductor L2, and a switching circuit 12.

The switching circuit 12 includes the first switching portion S1, the second switching portion S2, and a third switching portion S3. The third switching portion S3 is a connection point connected to the second end of the first coil antenna conductor L1 and the third end of the second coil antenna conductor L2 and switching the second end and the third end to either of a connection or disconnection state. The first switching portion S1 and the second switching portion S2 according to the present preferred embodiment are preferably, for example, SPST switches. The third switching portion S3 is preferably, for example, an SPST switch.

Figure 6A:
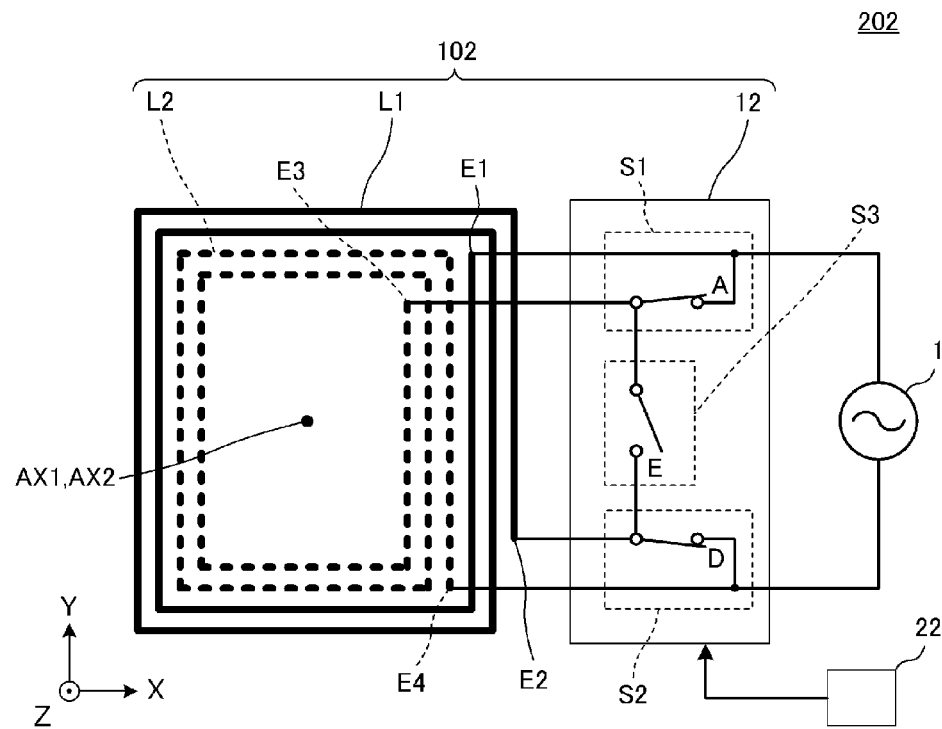
FIG. 6A is a plan view illustrating a connection state of the antenna device 102 and FIG. 6B is a plan view illustrating a connection state of the antenna device 102, which is different from that in FIG. 6A.
Figure 6B:
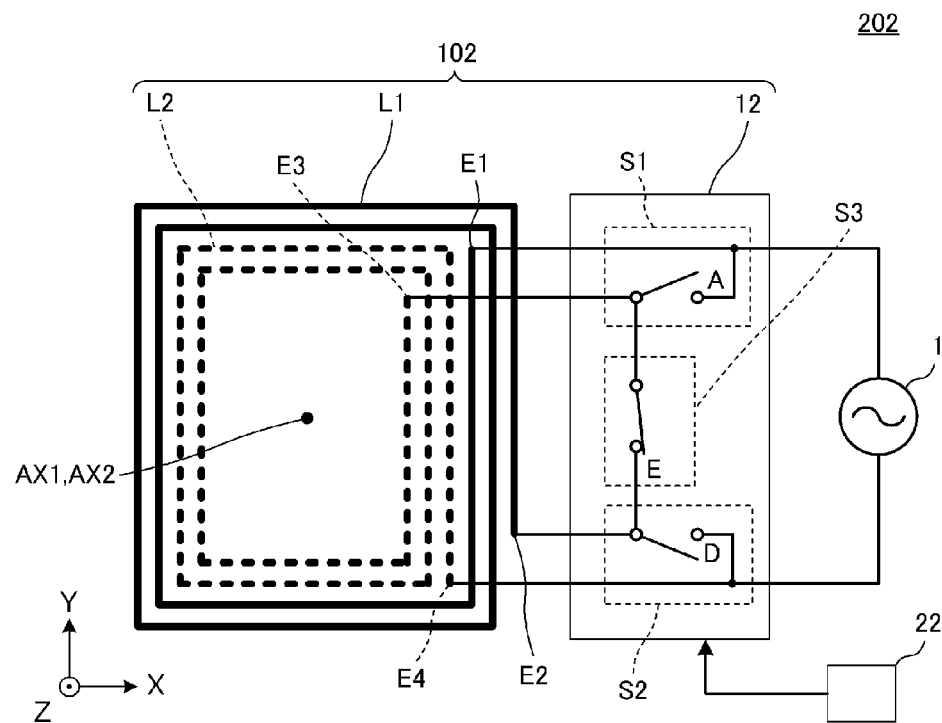

FIG. 6A is a plan view illustrating a connection state of the antenna device 102 and FIG. 6B is a plan view illustrating a connection state of the antenna device 102, which is different from that in FIG. 6A.

In the example of the connection state illustrated in FIG. 6A, the first switching portion S1 is in a connection state at the connection point A, the second switching portion S2 is in a connection state at the connection point D, and the third switching portion S3 is open. Therefore, the first end E1 of the first coil antenna conductor L1 and the third end E3 of the second coil antenna conductor L2 are connected to each other and the first end E1 and the third end E3 are connected to the power feeding circuit 1. Furthermore, the second end E2 of the first coil antenna conductor L1 and the fourth end E4 of the second coil antenna conductor L2 are connected to each other and the second end E2 and the fourth end E4 are connected to the power feeding circuit 1. The third end E3 (and the first end E1) and the second end E2 (and the fourth end E4) are disconnected from each other because the third switching portion S3 is open. Accordingly, the switching circuit 12 connects the first coil antenna conductor L1 and the second coil antenna conductor L2 to the power feeding circuit 1 in parallel.

On the other hand, in the example of the connection state illustrated in FIG. 6B, the first switching portion S1 is open, the second switching portion S2 is open, and the third switching portion S3 is in a connection state at a connection point E. Therefore, the first end E1 and the third end E3 are disconnected from each other and the first end E1 is connected to the power feeding circuit 1. Furthermore, the second end E2 and the fourth end E4 are disconnected from each other and the fourth end E4 is connected to the power feeding circuit 1. The second end E2 and the third end E3 are connected to each other. Accordingly, the switching circuit 12 connects the first coil antenna conductor L1 and the second coil antenna conductor L2 to the power feeding circuit 1 in series.

With this configuration, similar advantageous actions and effects to those of the antenna device 101 are provided.

Third Preferred Embodiment

The configurations of the first switching portion S1, the second switching portion S2, and the third switching portion S3 included in a switching circuit according to a third preferred embodiment of the present invention are different from those of the switching circuit 12 according to the second preferred embodiment. An electronic apparatus according to the present preferred embodiment is different from the electronic apparatus 202 according to the second preferred embodiment in that it includes no controller. A power feeding circuit 3 is different from the power feeding circuit 1 according to the second preferred embodiment in that it is able to be used for both of a first system and a second system. Other configurations are the same or substantially the same as those of the antenna device 102.

Figure 7:
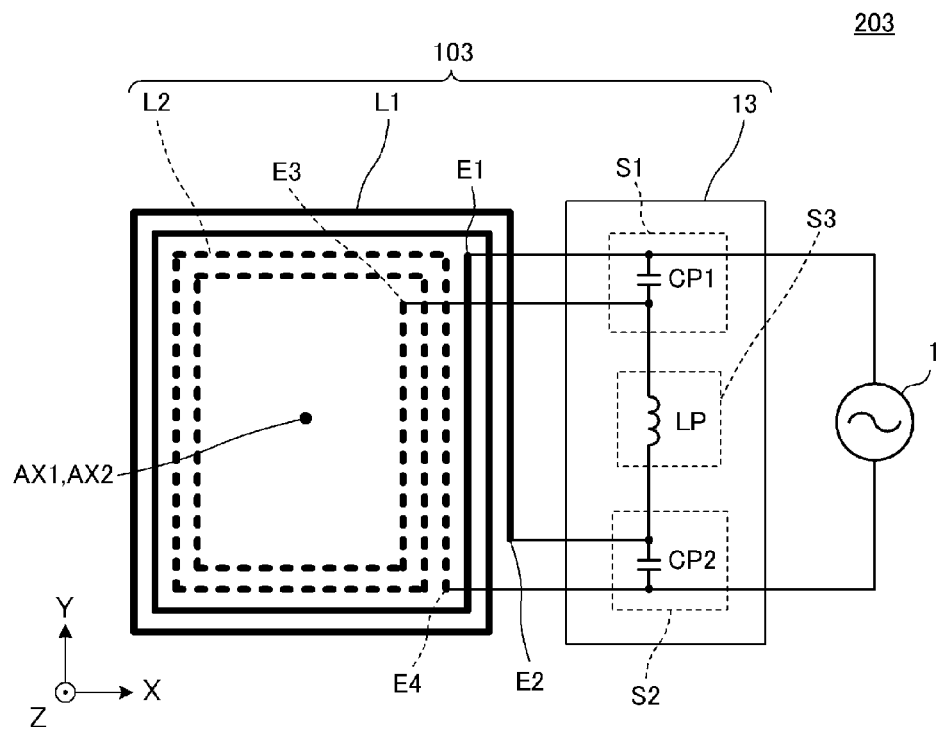
FIG. 7 is a plan view of an antenna device 103 included in an electronic apparatus 203 according to a third preferred embodiment of the present invention.

FIG. 7 is a plan view of an antenna device 103 included in an electronic apparatus 203 according to the third preferred embodiment. In FIG. 7, the second coil antenna conductor L2 is indicated with a dashed line in order to make the configuration of the second coil antenna conductor L2 easy to be understood.

The electronic apparatus 203 according to the present preferred embodiment includes the antenna device 103 and the power feeding circuit 3 that is connected to the antenna device 103. The antenna device 103 includes the first coil antenna conductor L1, the second coil antenna conductor L2, and a switching circuit 13. The power feeding circuit 3 in the present preferred embodiment is able to be used for both of the first system and the second system. The frequency that the first system handles is higher than the frequency that the second system handles.

The switching circuit 13 includes the first switching portion S1, the second switching portion S2, and the third switching portion S3. The first switching portion S1 and the second switching portion S2 in the present preferred embodiment are preferably, for example, capacitors, and the third switching portion S3 is preferably, for example, an inductor. That is to say, a switching circuit 13 is defined by a filter circuit including an inductor LP and capacitors CP1 and CP2.

For example, in the first system, the first switching portion S1 and the second switching portion S2 have low impedances and are in short-circuit states equivalently or are close to the short-circuit states, and the third switching portion S3 has a high impedance and is in an open state equivalently or is close to the open state. Accordingly, in the first system (with a higher frequency than that of the second system), the switching circuit 13 connects the first coil antenna conductor L1 and the second coil antenna conductor L2 to the power feeding circuit 3 in parallel. In other words, in the first system, the switching circuit 13 provides a current flowing through a path that passes through the first switching portion S1 and the second switching portion S2 and does not pass through the third switching portion S3 (current flowing through a path in which the first coil antenna conductor L1 and the second coil antenna conductor L2 are connected to the power feeding circuit 3 in parallel) that is larger than a current flowing through the same path in the second system.

For example, in the second system, the first switching portion S1 and the second switching portion S2 have high impedances and are in open states equivalently or are close to the open states, and the third switching portion S3 has a low impedance and is in a short-circuit state equivalently or is close to the short-circuit state. Accordingly, in the second system (having a lower frequency than that of the first system), the switching circuit 13 connects the first coil antenna conductor L1 and the second coil antenna conductor L2 to the power feeding circuit 3 in series. In other words, in the second system, the switching circuit 13 provides a current flowing through a path that does not pass through the first switching portion S1 and the second switching portion S2 and passes through the third switching portion S3 (current flowing through a path in which the first coil antenna conductor L1 and the second coil antenna conductor L2 are connected to the power feeding circuit 3 in series) that is larger than a current flowing through the same path in the first system.

As described above, in an electronic apparatus that is used in a plurality of different systems, when usage frequencies of the respective systems are sufficiently different from one another, passive elements, such as the inductor and the capacitors, may preferably be used for the first switching portion S1, the second switching portion S2, and the third switching portion S3 to thus provide the advantageous effects of preferred embodiments of the present invention without including the controller. The passive elements, such as the inductor and the capacitors, may not be used independently but an LC filter provided by combining them, for example, may be used. That is to say, frequency filters may be used for the first switching portion S1, the second switching portion S2, and the third switching portion S3 instead of the switches as long as the frequencies that the first system and the second system handle are sufficiently different from each other.

Fourth Preferred Embodiment

An antenna device according to a fourth preferred embodiment of the present invention is different from the antenna device 102 according to the second preferred embodiment in that an electronic apparatus includes a first system power feeding circuit and a second system power feeding circuit and a switching circuit includes a fourth switching portion. Furthermore, the switching circuit is different from the switching circuit 12 according to the second preferred embodiment in that it includes no third switching portion. Other configurations are the same or substantially the same as those of the antenna device 102.

Figure 8:
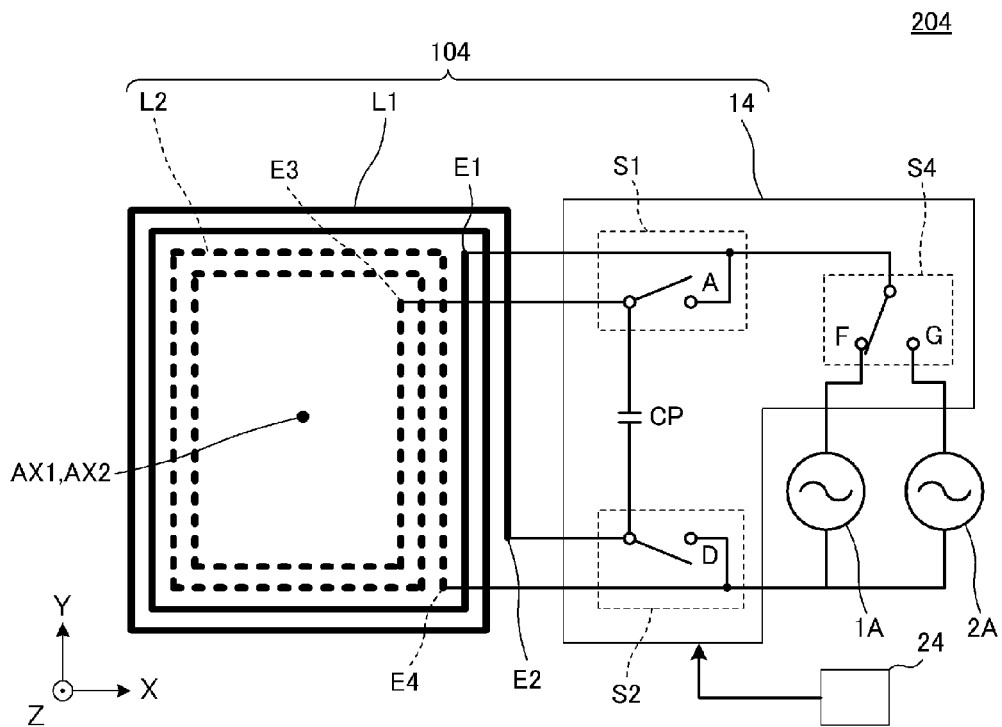
FIG. 8 is a plan view of an antenna device 104 included in an electronic apparatus 204 according to a fourth preferred embodiment of the present invention.

FIG. 8 is a plan view of an antenna device 104 included in an electronic apparatus 204 according to the fourth preferred embodiment. In FIG. 8, the second coil antenna conductor L2 is indicated with a dashed line in order to make the configuration of the second coil antenna conductor L2 easy to be understood. The same holds true in FIGS. 9A and 9B, which will be described below.

The electronic apparatus 204 according to the present preferred embodiment includes the antenna device 104, a controller 24, a first system power feeding circuit 1A, and a second system power feeding circuit 2A. The antenna device 104 includes the first coil antenna conductor L1, the second coil antenna conductor L2, and a switching circuit 14. The power feeding circuit according to the present preferred embodiment includes the first system power feeding circuit 1A and the second system power feeding circuit 2A.

The first system in the present preferred embodiment is preferably a communication system such as an NFC system, for example. The NFC system is a communication system using near field communication (NFC), for example, and a frequency of an HF band, in particular, around 13.56 MHz is used therefor. When the first system is the NFC system, the electronic apparatus makes communication with a communication party by magnetic field coupling.

The second system in the present preferred embodiment is preferably a power transmission system such as a magnetic field resonance power transmission system, for example. The magnetic field resonance power transmission system is used with a frequency of an HF band, in particular, around 6.78 MHz. When the second system is a magnetic field non-contact power transmission system, the electronic apparatus performs power transmission while being coupled to a power transmission party by magnetic field coupling. The power transmission system is used for, for example, charging an electronic apparatus, such as a smart phone, for example.

The first system power feeding circuit 1A is preferably a power feeding circuit for the NFC system, such as an HF-band IC, for example. The second system power feeding circuit 2A is preferably a power transmission circuit or a power receiving circuit for the magnetic field resonance power transmission system, for example.

The switching circuit 14 includes the first switching portion S1, the second switching portion S2, and the fourth switching portion S4. The fourth switching portion S4 is connected to each of the first switching portion S1, the first system power feeding circuit 1A, and the second system power feeding circuit 2A. The fourth switching portion S4 switches the first switching portion S1 and the second switching portion S2 to connect either of the first system power feeding circuit 1A or the second system power feeding circuit 2A. Accordingly, the first switching portion S1 and the second switching portion S2 are connected to either of the first system power feeding circuit 1A or the second system power feeding circuit 2A. In the present preferred embodiment, a capacitor is connected between the second end of the first coil antenna conductor L1 and the third end of the second coil antenna conductor L2. The fourth switching portion S4 is preferably, for example, an SPDT switch.

Figure 9A:
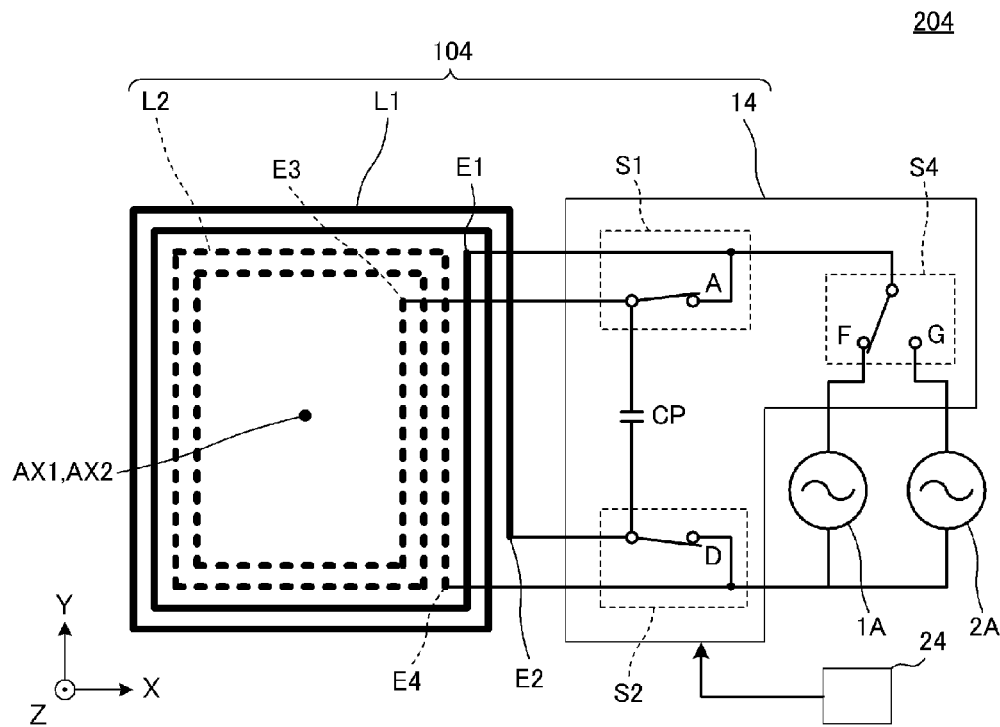
FIG. 9A is a plan view illustrating a connection state of the antenna device 104 and FIG. 9B is a plan view illustrating a connection state of the antenna device 104, which is different from that in FIG. 9A.
Figure 9B:
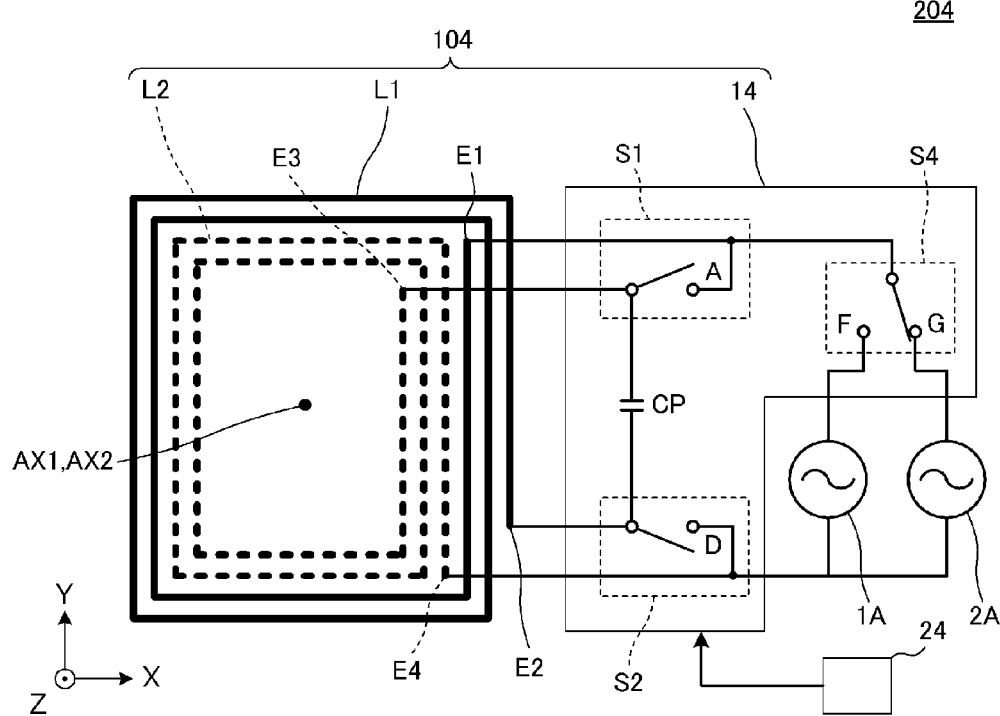

FIG. 9A is a plan view illustrating a connection state of the antenna device 104 and FIG. 9B is a plan view illustrating a connection state of the antenna device 104, which is different from that in FIG. 9A.

In the example of the connection state illustrated in FIG. 9A, the first switching portion S1 is in a connection state at the connection point A, the second switching portion S2 is in a connection state at the connection point D, and the fourth switching portion S4 is in a connection state at a connection point F. Therefore, the first end E1 of the first coil antenna conductor L1 and the third end E3 of the second coil antenna conductor L2 are connected to each other and the first end E1 and the third end E3 are connected to the first system power feeding circuit 1A. The second end E2 of the first coil antenna conductor L1 and the fourth end E4 of the second coil antenna conductor L2 are connected to each other and the second end E2 and the fourth end E4 are connected to the first system power feeding circuit 1A. That is to say, the fourth switching portion S4 connects the first switching portion S1 and the second switching portion S2 to input and output terminals of the first system power feeding circuit 1A, respectively. A capacitor CP is connected between the second end E2 and the third end E3. In this manner, the switching circuit 14 connects the first coil antenna conductor L1, the second coil antenna conductor L2, and the capacitor CP to the first system power feeding circuit 1A in parallel.

A connection state in which the fourth switching portion S4 connects the first switching portion S1 and the second switching portion S2 to the first system power feeding circuit 1A, the first switching portion S1 connects the first end E1 and the third end E3 to each other and connects the first end E1 and the third end E3 to the first system power feeding circuit 1A, the second switching portion S2 connects the second end E2 and the fourth end E4 to each other and connects the second end E2 and the fourth end E4 to the first system power feeding circuit 1A (a state in which the first coil antenna conductor L1, the second coil antenna conductor L2, and the capacitor CP are connected in parallel) is an example of the "first connection state".

On the other hand, in the example of the connection state illustrated in FIG. 9B, the first switching portion S1 is opened, the second switching portion S2 is opened, and the fourth switching portion S4 is in a connection state at a connection point G. Therefore, the first end E1 and the third end E3 are disconnected from each other and the first end E1 is connected to the second system power feeding circuit 2A. The second end E2 and the fourth end E4 are disconnected from each other and the fourth end E4 is connected to the second system power feeding circuit 2A. That is to say, the fourth switching portion S4 connects the first switching portion S1 and the second switching portion S2 to input and output terminals of the second system power feeding circuit 2A, respectively. A capacitor CP is connected to between the second end E2 and the third end E3. In this manner, the switching circuit 14 connects the first coil antenna conductor L1, the second coil antenna conductor L2, and the capacitor CP to the second system power feeding circuit 2A in series.

A connection state in which the fourth switching portion S4 connects the first switching portion S1 and the second switching portion S2 to the second system power feeding circuit 2A, the first switching portion S1 disconnects the first end E1 and the third end E3 from each other, the first end E1 and the fourth end E4 are connected to the second system power feeding circuit 2A, the second switching portion S2 disconnects the second end E2 and the fourth end E4 from each other, and the first switching portion S1 and the second switching portion S2 connect the second end E2 and the third end E3 to each other (a state in which the first coil antenna conductor L1, the second coil antenna conductor L2, and the capacitor CP are connected in series) is an example of the "second connection state".

The controller 24 according to the present preferred embodiment is configured or programmed to control whether the switching circuit 14 is in either of the "first connection state" or the "second connection state".

The antenna device 104 according to the present preferred embodiment provides the following advantageous effects in addition to the advantageous effects described in the second preferred embodiment.

In the electronic apparatus 204 according to the present preferred embodiment, the switching circuit 14 includes the fourth switching portion S4 switching the first switching portion S1 and the second switching portion S2 to connect either of the first system power feeding circuit 1A or the second system power feeding circuit 2A. With this configuration, the electronic apparatus including the antenna device is able to be used in a plurality of different systems.

The electronic apparatus 204 according to the present preferred embodiment includes the controller 24 switching the switching circuit 14 to either of the "first connection state" and the "second connection state". With this configuration, the electronic apparatus including the antenna device is able to be used in a plurality of different systems and to switch antenna characteristics in accordance with the system which is used.

In the present preferred embodiment, the capacitor CP is connected between the second end of the first coil antenna conductor L1 and the third end of the second coil antenna conductor L2. With this configuration, the inductance of the first coil antenna conductor L1, the inductance of the second coil antenna conductor L2, and capacitance components of the capacitor CP and the power feeding circuit (first system power feeding circuit 1A or the second system power feeding circuit 2A) define an LC resonance circuit.

Although the switching circuit 14 includes no third switching portion, as an example, in the present preferred embodiment, the third switching portion and the capacitor CP may be connected in series between the second end and the third end.

Fifth Preferred Embodiment

A switching circuit according to a fifth preferred embodiment of the present is different from the switching circuit 11 according to the first preferred embodiment in that the first coil antenna conductor L1 and the second coil antenna conductor L2 are connected such that the circumferential direction of a current flowing through the first coil antenna conductor L1 and the circumferential direction of a current flowing through the second coil antenna conductor L2 are opposite directions. Other configurations are the same or substantially the same as those of the antenna device 101.

Figure 10A:
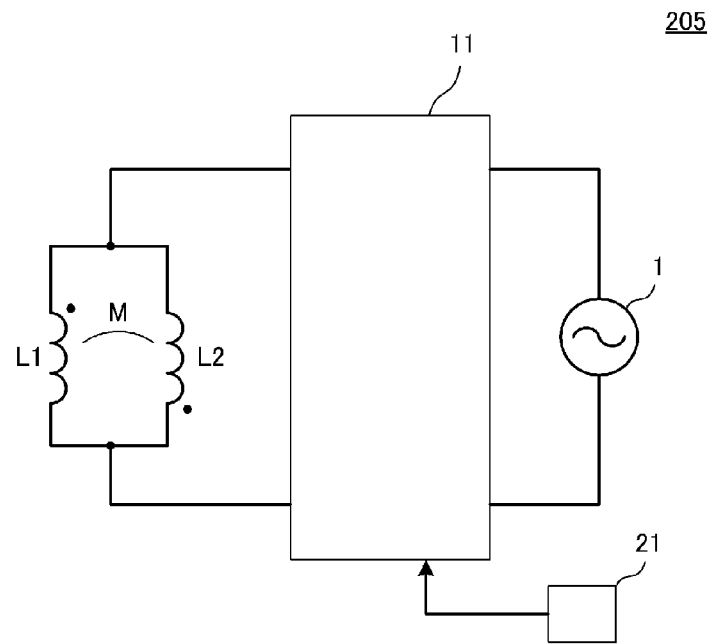
FIG. 10A is a view schematically illustrating an electronic apparatus 205 in a first connection state and FIG. 10B is a view schematically illustrating the electronic apparatus 205 in a second connection state.
Figure 10B:
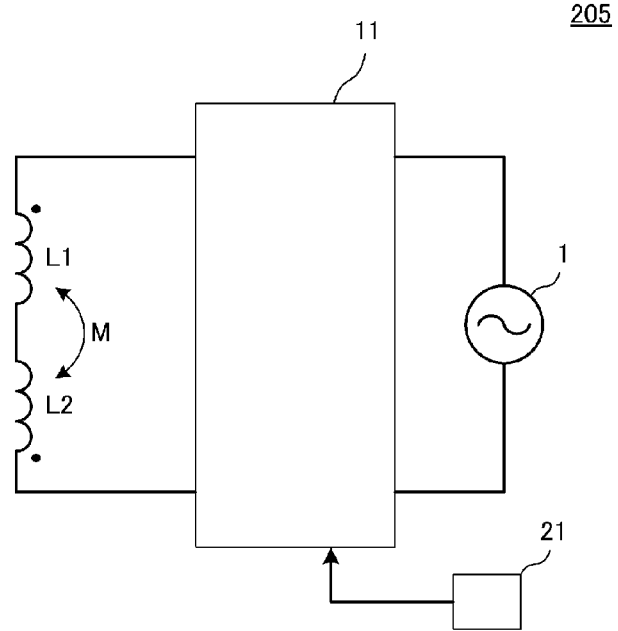

FIG. 10A is a view schematically illustrating an electronic apparatus 205 in a first connection state and FIG. 10B is a view schematically illustrating the electronic apparatus 205 in a second connection state.

As illustrated in FIGS. 10A and 10B, in the "first connection state" and the "second connection state", the first coil antenna conductor L1 and the second coil antenna conductor L2 are magnetic field coupled to each other.

In the present preferred embodiment, the circumferential direction of the current flowing through the first coil antenna conductor L1 and the circumferential direction of the current flowing through the second coil antenna conductor L2 are opposite directions when seen from the Z-axis direction in both of the "first connection state" and the "second connection state". Therefore, a magnetic flux that is generated by the current flowing through the first coil antenna conductor L1 and a magnetic flux that is generated by the current flowing through the second coil antenna conductor L2 are canceled with each other (a mutual inductance M between the first coil antenna conductor L1 and the second coil antenna conductor L2 is negative). Even with this configuration, determination of the coupling degree between the first coil antenna conductor L1 and the second coil antenna conductor L2 enables the antenna devices having various inductance values and conductor losses to be obtained, thus increasing the degree of freedom in design of the antenna device.

Although the first coil antenna conductor L1 and the second coil antenna conductor L2 preferably have the rectangular or substantially rectangular spiral conductor patterns wound clockwise when seen from the Z-axis direction, as an example, in each of the above-described preferred embodiments, the present invention is not limited to this configuration. The outer shapes of the first coil antenna conductor L1 and the second coil antenna conductor L2 may be appropriately changed to circular or substantially circular shapes, elliptical or substantially elliptical shapes, polygonal shapes, or other suitable shapes when seen from the Z-axis direction. The first coil antenna conductor L1 and the second coil antenna conductor L2 may be loop-shaped conductors, helical-shaped conductors, or other suitable suitably shaped conductors. Both of the first coil antenna conductor L1 and the second coil antenna conductor L2 may be wound counterclockwise. The first coil antenna conductor L1 may be wound clockwise and the second coil antenna conductor L2 may be wound counterclockwise. Alternatively, the first coil antenna conductor L1 may be wound counterclockwise whereas the second coil antenna conductor L2 may be wound clockwise.

Although the numbers of windings of the first coil antenna conductor L1 and the second coil antenna conductor L2 are preferably more than two turns, as an example, in each of the above-described preferred embodiments, the present invention is not limited to this configuration. The numbers of windings of the first coil antenna conductor L1 and the second coil antenna conductor L2 may be changed in a range of providing the advantageous effects of the preferred embodiments of present invention and the numbers of windings of the first coil antenna conductor L1 and the second coil antenna conductor L2 may be different from each other.

Although the outer diameter of the second coil antenna conductor L2 is smaller than the inner diameter of the first coil antenna conductor L1, that is, the outer diameter of the second coil antenna conductor L2 is smaller than the outer diameter of the first coil antenna conductor L1, as an example, in each of the above-described preferred embodiment, the present invention is not limited to this configuration. The outer diameter of the first coil antenna conductor L1 and the outer diameter of the second coil antenna conductor L2 may be the same or substantially the same as each other or the outer diameter of the second coil antenna conductor L2 may be larger than the outer diameter of the first coil antenna conductor L1.

Although the antenna device includes the two coil antenna conductors, as an example, in each of the above-described preferred embodiment, the present invention is not limited to this configuration. The antenna device may include equal to or more than three coil antenna conductors. In such a case, the advantageous effects of the preferred embodiments of the present invention are provided with the configuration in which all of the coil antenna conductors are used when the antenna device is used.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device comprising:
   a first coil antenna conductor wound around a first axis and including a first end and a second end;
   a second coil antenna conductor wound around a second axis and including a third end and a fourth end; and
   a switching circuit to switch a first connection state in which the first coil antenna conductor and the second coil antenna conductor are connected in parallel and a second connection state in which the first coil antenna conductor and the second coil antenna conductor are connected in series; wherein
   the first coil antenna conductor and the second coil antenna conductor are provided on a same plane.

2. The antenna device according to claim 1, wherein the switching circuit includes:
   a first switching portion to switch the first end of the first coil antenna conductor and the third end of the second coil antenna conductor into either of a connection or disconnection state; and
   a second switching portion to switch the second end of the first coil antenna conductor and the fourth end of the second coil antenna conductor into either of a connection or disconnection state.

3. The antenna device according to claim 2, wherein the switching circuit further includes a third switching portion to switch the second end of the first coil antenna conductor and the third end of the second coil antenna conductor into either of a connection or disconnection state.

4. The antenna device according to claim 1, further comprising a capacitor connecting the second end of the first coil antenna conductor and the third end of the second coil antenna conductor.

5. The antenna device according to claim 1, wherein
   the first coil antenna conductor includes a first coil opening;
   the second coil antenna conductor includes a second coil opening; and
   at least a portion of the first coil opening overlaps with the second coil opening when seen from a direction of the first axis of the first coil antenna conductor.

6. The antenna device according to claim 1, wherein the switching circuit connects the first coil antenna conductor and the second coil antenna conductor such that a circumferential direction of a current flowing through the first coil antenna conductor and a circumferential direction of a current flowing through the second coil antenna conductor are the same direction when seen from a direction of the first axis of the first coil antenna conductor.

7. The antenna device according to claim 1, wherein each of the first coil antenna conductor and the second coil antenna conductor have a rectangular or substantially rectangular shape.

8. An electronic apparatus comprising:
 an antenna device; and
 a power feeding circuit connected to the antenna device; wherein
 the antenna device includes:
  a first coil antenna conductor wound around a first axis and including a first end and a second end;
  a second coil antenna conductor wound around a second axis and including a third end and a fourth end; and
  a switching circuit to switch a first connection state in which the first coil antenna conductor and the second coil antenna conductor are connected in parallel and a second connection state in which the first coil antenna conductor and the second coil antenna conductor are connected in series;
 the switching circuit is connected to the power feeding circuit;
 the switching circuit includes:
  a first switching portion to switch the first end of the first coil antenna conductor and the third end of the second coil antenna conductor into either of a connection or disconnection state; and
  a second switching portion to switch the second end of the first coil antenna conductor and the fourth end of the second coil antenna conductor into either of a connection or disconnection state;
 the power feeding circuit includes a first system power feeding circuit for a first system and a second system power feeding circuit for a second system;
 the first switching portion and the second switching portion are connected to either of the first system power feeding circuit or the second system power feeding circuit; and
 the first system power feeding circuit is a near field communication system.

9. The electronic apparatus according to claim 8, further comprising:
 a controller to switch the switching circuit into the first connection state or the second connection state; wherein
 the switching circuit further includes a fourth switching portion to switch the first switching portion and the second switching portion to connect either of the first system power feeding circuit or the second system power feeding circuit;
 in the first connection state,
 the fourth switching portion connects the first switching portion and the second switching portion to the first system power feeding circuit;
 the first switching portion connects the first end of the first coil antenna conductor and the third end of the second coil antenna conductor to each other and connects the first end and the third end to the first system power feeding circuit; and
 the second switching portion connects the second end of the first coil antenna conductor and the fourth end of the second coil antenna conductor to each other and connects the second end and the fourth end to the first system power feeding circuit; and
 in the second connection state,
 the fourth switching portion connects the first switching portion and the second switching portion to the second system power feeding circuit;
 the first switching portion disconnects the first end of the first coil antenna conductor and the third end of the second coil antenna conductor from each other and connects the first end to the second system power feeding circuit;
 the second switching portion disconnects the second end of the first coil antenna conductor and the fourth end of the second coil antenna conductor from each other and connects the fourth end to the second system power feeding circuit; and
 the first switching portion and the second switching portion connect the second end and the third end to each other.

10. The electronic apparatus according to claim 8, wherein the second system power feeding circuit is a power transmission system.

11. The electronic apparatus according to claim 10, wherein the power transmission system is a magnetic field resonance power transmission system.

12. The electronic apparatus according to claim 8, wherein the switching circuit further includes a third switching portion to switch the second end of the first coil antenna conductor and the third end of the second coil antenna conductor into either of a connection state or a disconnection state.

13. The electronic apparatus according to claim 8, further comprising a capacitor connecting the second end of the first coil antenna conductor and the third end of the second coil antenna conductor.

14. The electronic apparatus according to claim 8, wherein
 the first coil antenna conductor includes a first coil opening;
 the second coil antenna conductor includes a second coil opening; and
 at least a portion of the first coil opening overlaps with the second coil opening when seen from a direction of the first axis of the first coil antenna conductor.

15. The electronic apparatus according to claim 8, wherein the switching circuit connects the first coil antenna conductor and the second coil antenna conductor such that a circumferential direction of a current flowing through the first coil antenna conductor and a circumferential direction of a current flowing through the second coil antenna conductor are the same direction when seen from a direction of the first axis of the first coil antenna conductor.

16. An electronic apparatus comprising:
 an antenna device; and
 a power feeding circuit connected to the antenna device; wherein
 the antenna device includes:
  a first coil antenna conductor wound around a first axis and including a first end and a second end;
  a second coil antenna conductor wound around a second axis and including a third end and a fourth end; and
  a switching circuit to switch a first connection state in which the first coil antenna conductor and the second coil antenna conductor are connected in parallel and a second connection state in which the first coil antenna conductor and the second coil antenna conductor are connected in series;

the switching circuit is connected to the power feeding circuit; and the first coil antenna conductor and the second coil antenna conductor are provided on a same plane.

17. The electronic apparatus according to claim 16, wherein the switching circuit includes:
- a first switching portion to switch the first end of the first coil antenna conductor and the third end of the second coil antenna conductor into either of a connection or disconnection state; and
- a second switching portion to switch the second end of the first coil antenna conductor and the fourth end of the second coil antenna conductor into either of a connection or disconnection state; and the first switching portion and the second switching portion are connected to the power feeding circuit.

18. The electronic apparatus according to claim 17, wherein the power feeding circuit includes a first system power feeding circuit for a first system and a second system power feeding circuit for a second system; and the first switching portion and the second switching portion are connected to either of the first system power feeding circuit or the second system power feeding circuit.

19. The electronic apparatus according to claim 18, wherein the first system power feeding circuit is a communication system.

20. The electronic apparatus according to claim 16, wherein the switching circuit connects the first coil antenna conductor and the second coil antenna conductor such that a circumferential direction of a current flowing through the first coil antenna conductor and a circumferential direction of a current flowing through the second coil antenna conductor are the same direction when seen from a direction of the first axis of the first coil antenna conductor.

* * * * *